United States Patent Office 2,927,053
Patented Mar. 1, 1960

2,927,053

METHOD OF DESTROYING FUNGI EMPLOYING ALKOXYBENZYL ALKANOL AMINES

Jamal S. Eden, Akron, Ohio, assignor to Diamond Alkali Company, Cleveland, Ohio, a corporation of Delaware No Drawing. Application October 8, 1956
Serial No. 614,363

3 Claims. (Cl. 167—30)

This invention relates to novel alkoxybenzyl alkanol-amines.

More specifically the present invention relates to novel compounds having the structure

wherein R is a hydroxy alkyl group such as

—CH$_2$CH$_2$—OH or —CH$_2$CH$_2$CH$_2$—OH. Illustrative specific compounds of the above type are the compounds having the structure 2-(p-methoxybenzylamino)-ethanol

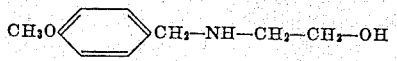

3-(p-methoxybenzylamino)-propanol

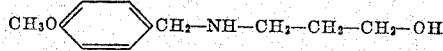

Compounds of the above type are useful in a number of applications such as biologically active materials in formulations adopted for use as fungicides as well as in other uses.

The materials can be prepared by combining an alkanolamine such as ethanolamine or 3-amino propanol, with anisaldehyde and catalytically hydrogenating this mixture. Initial reaction to remove water desirably is carried out in an organic solvent, e.g., benzene, at an elevated temperature. The benzene is removed and the mixture catalytically hydrogenated using a catalyst such as platinum oxide (PtO$_2$) with vacum distillation or other separation means to recover the desired product.

In order that those skilled in the art may more completely understand the present invention and the preferred methods by which the same may be carried into effect, the following specific examples are offered:

EXAMPLE I (Part A)

PREPARATION OF 2-(p-METHOXYBENZYLAMINO)-ETHANOL

A mixture of 61 gm. (1.0 mol) of ethanolamine, 136 gm. (1.0 mol) of anisaldehyde and 300 ml. of benzene is refluxed for 3 hours during which time 19 ml. of water is collected in a water separator. Benzene is then removed by distillation at atmospheric pressure. One half the thus-treated material is catalytically hydrogenated by dissolving it in 250 ml. of methanol and adding 1.0 gm. platinum oxide (PtO$_2$). Catalytic hydrogenation is carried out at an initial hydrogen pressure of 65 p.s.i.g., the pressure decreasing to 22.5 p.s.i.g. at the end of the hydrogenation. Methanol is then removed by distillation at atmospheric pressure and the product is vacuum distilled at 145°–147° C. at 2–2.3 mm. Hg to yield a colorless oil weighing 147 gm.

Chemical analysis of this product indicates preparation of the desired C$_{10}$H$_{15}$NO$_2$ and is as follows:

| Element | Percent Actual | Percent Calculated |
|---|---|---|
| C | 65.53 | 66.3 |
| H | 8.25 | 8.28 |

The 2-(p-methoxybenzylamino)-ethanol thus prepared has a refractive index of 1.5461 at 20° C.

(Part B)

To illustrate the biological activity of the product of Part A, fungicidal tests are conducted against early tomato blight fungus *Alternaria solani*. In this procedure, the product of Part A is employed as aqueous formulations at concentrations of 2000 and 400 p.p.m., respectively (using 5% acetone and 0.01% Triton X–155 (alkyl aryl polyether alcohol) as an emulsifier). These formulations are applied to growing tomato plants (var. Bonny Best), 5 to 7 inches tall. These formulations are sprayed on the plants and allowed to dry; comparable untreated plants are sprayed with the same formulation, less the toxicant. The thus-treated plants are then sprayed with a spore suspension containing approximately 20,000 conidia of *Alternaria solani* per ml. and held at 100% relative humidity for 24 hours at 70° F. and are then removed to a greenhouse. After 2 to 4 days, lesion counts are made on the three uppermost fully expanded leaves and the data thus obtained are converted to percentage disease control based on the number of lesions obtained on the control plants. Following this procedure, it is observed that at the concentrations of 2000 and 400 p.p.m., respectively, the product of Part A is effective in obtaining a 98% and 85% disease control, respectively, thus indicating a high degree of fungicidal effectiveness.

EXAMPLE II (Part A)

PREPARATION OF 3-(p-METHOXYBENZYLAMINO)-PROPANOL

A mixture of 75 gm. (1 mol) of 3-aminopropanol, 136 gm. (1 mol) of anisaldehyde and 300 ml. of benzene is refluxed under a water separator for 3 hours until 19 ml. of water is collected. The benzene is then removed by distillation at atmospheric pressure. One-half the thus-prepared mixture is subjected to catalytic hydrogenation using 1.0 gm. of platinum oxide (PtO$_2$) as catalyst and 250 ml. of methanol, initially adjusting the hydrogen pressure to 65 p.s.i.g. Hydrogenation proceeds until the pressure reaches 23 p.s.i.g.

Following catalytic hydrogenation, the platinum oxide (PtO$_2$) is removed and the methanol separated by distillation. The resultant product is then distilled at 162°–165° C. at 2.5–3 mm. Hg to obtain a colorless liquid weighing 169 gm. Chemical analysis of this product indicates the formation of the desired C$_{11}$H$_{12}$NO$_2$ and is as follows:

| Element | Percent Actual | Percent Calculated |
|---|---|---|
| C | 67.5 | 67.7 |
| H | 8.89 | 8.72 |

(Part B)

The procedure of Example I, Part B is repeated using the product of Example II, Part A at a concentration of 4000 p.p.m. A 79% disease control is observed, thus indicating a high degree of fungicidal effectiveness.

Compounds of this invention exhibit biological activity as heretofore shown. These compounds are to be employed in a variety of formulations both liquid and solid including finely-divided powders, granular materials, as well as those liquid solutions, concentrates, emulsifiable concentrates, slurries, and the like, depending upon the application intended and the formulation media employed.

Hence, it will be appreciated that it is contemplated the compounds used in this invention form biologically active materials which can be employed as an essential ingredient in various compositions which may include such diluents, extenders, fillers, conditioners, solvents and the like as various clays, diatomaceous earth, talc, spent catalyst, alumina silica materials and such liquids as water and various organic liquids such as acetone, kerosene, benzene, toluene, xylene, and other petroleum distillate fractions or mixtures thereof. When liquid formulations are employed or dry materials prepared which are to be used in liquid form, it is desirable in certain instances additionally to employ a wetting, emulsifying, or dispersing agent to facilitate use of the formulation, e.g., Triton X-155 (alkyl aryl polyether alcohol).

It is to be understood that although the invention has been described with specific reference to particular embodiments thereof, it is not to be so limited, since changes and alterations therein may be made which are within the full intended scope of this invention as defined by the appended claims.

What is claimed is:

1. The method of controlling fungus growth which comprises applying as a fungicide a composition containing as an essential active ingredient a compound having the formula

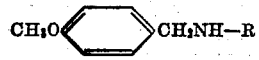

wherein R is a terminal hydroxy substituted lower alkyl group.

2. The method of controlling fungus growth which comprises applying as a fungicide a composition containing as an essential active ingredient a compound having the formula

3. The method of controlling fungus growth which comprises applying as a fungicide a composition containing as an essential active ingredient a compound having the formula

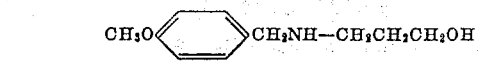

References Cited in the file of this patent

UNITED STATES PATENTS

| | | |
|---|---|---|
| 2,430,722 | Ladd et al. | Nov. 11, 1947 |
| 2,545,498 | Sondern et al. | Mar. 20, 1951 |
| 2,574,620 | Carlsson | Nov. 13, 1951 |
| 2,626,227 | Lambrech | Jan. 20, 1953 |
| 2,683,744 | Kerwin et al. | July 13, 1954 |

OTHER REFERENCES

Engelhardt et al.: J. Am. Chem. Soc., 72, 2718–2722 (1950).